Nov. 24, 1942.    V. WEBER ET AL    2,303,012
THERMOSTATIC CONTROL
Filed Dec. 12, 1940    2 Sheets-Sheet 1
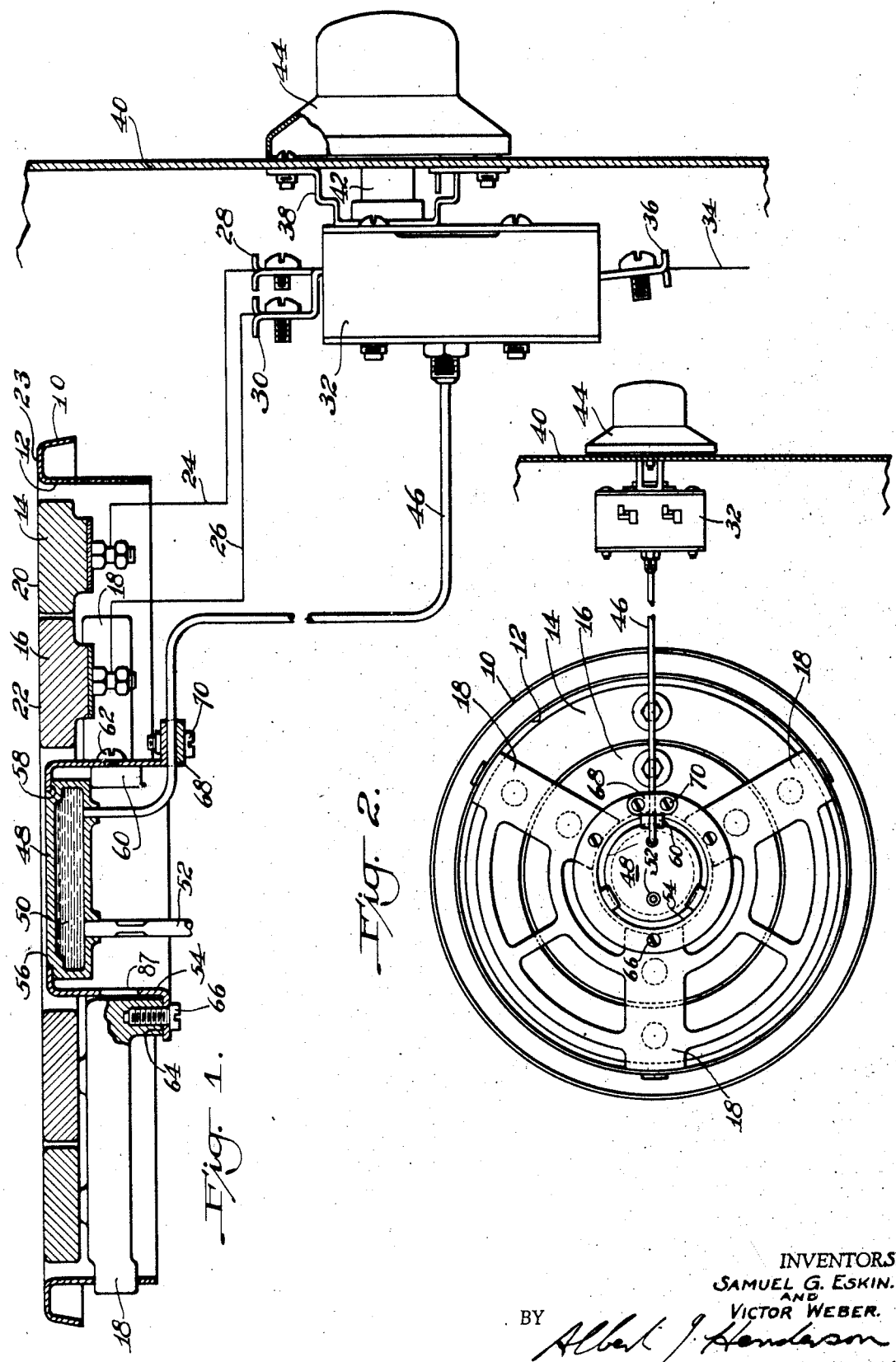
INVENTORS.
SAMUEL G. ESKIN.
AND
VICTOR WEBER.
BY Albert J. Henderson
ATTORNEY.

Nov. 24, 1942.     V. WEBER ET AL     2,303,012
THERMOSTATIC CONTROL
Filed Dec. 12, 1940     2 Sheets-Sheet 2
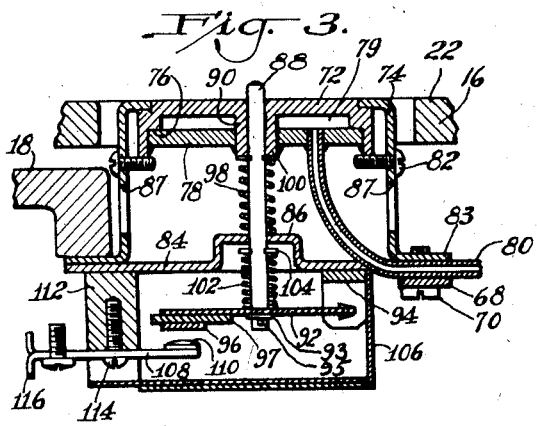
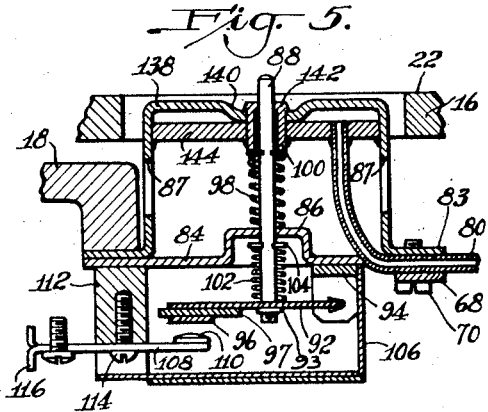
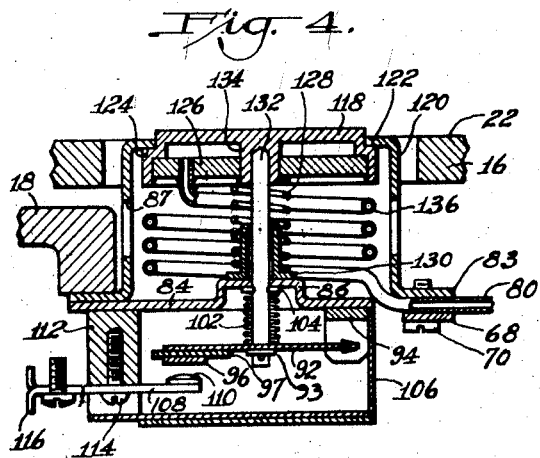
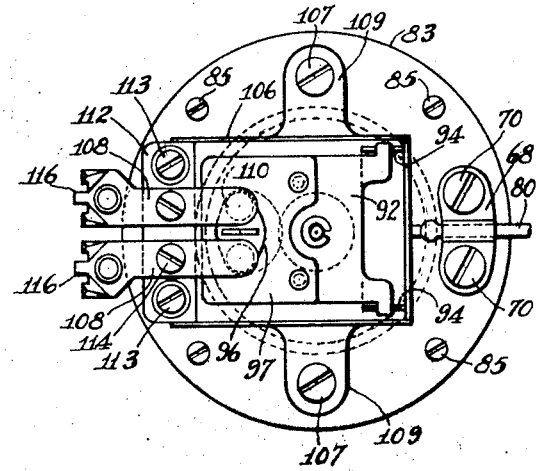
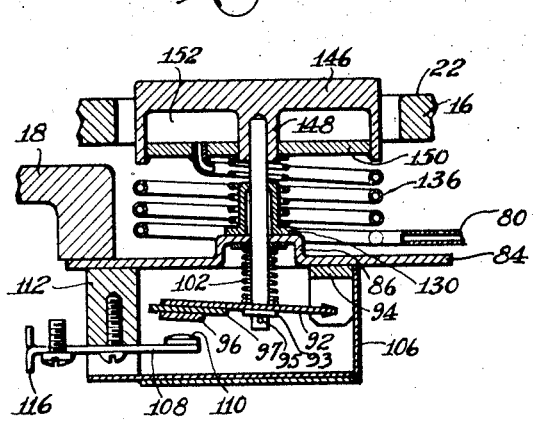
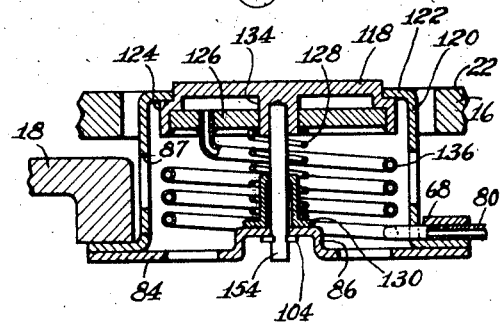
INVENTORS.
SAMUEL G. ESKIN.
AND
VICTOR WEBER.
BY Albert J. Henderson
ATTORNEY.

Patented Nov. 24, 1942

2,303,012

UNITED STATES PATENT OFFICE 2,303,012

THERMOSTATIC CONTROL

Victor Weber, Greensburg, and Samuel G. Eskin, Pittsburgh, Pa., assignors to Robertshaw Thermostat Company, Youngwood, Pa., a corporation of Pennsylvania Application December 12, 1940, Serial No. 369,740

2 Claims. (Cl. 219—37)

This invention relates to thermostatic controls, and more particularly to controls for surface heaters of cooking ranges.

Thermostatic control of the surface heaters or top elements of cooking ranges has long been considered desirable to protect the contents of the cooking vessel placed thereon. While such controls have been proposed, heretofore no satisfactory solution of the various difficulties which presented themselves has been offered. In the case of thermostatic controls for ovens or other compartments of ranges where baking and broiling operations are carried on, the degree of oven heat is a satisfactory measure of the condition of the food being cooked. Consequently the thermally sensitive element need only be subjected to the heat in the oven to provide adequate control of the cooking operation.

In the case of surface heaters, however, other problems are encountered. There is no compartment within which a uniform degree of heat can be maintained and within which the food can be housed. On the contrary, the boiling or frying operations which are conducted over the surface heaters usually involve the use of a cooking vessel within which the material can be brought to proper heat. The mere location of the thermal element in the ambient temperature zone of the surface heater would not provide accurate indication of the temperature of the cooking vessel or the condition of the food therein. Practical considerations forbid the placing of the thermal element within the cooking vessel or in contact with the food. Consequently contact of the thermal element with the cooking vessel must be on the exterior, easily made and broken, and within the zone of greatest heat of the heating elements.

It is, however, apparent that the thermal element should respond to the temperature at the cooking vessel and not to that prevailing at the source of heat, despite the close proximity between them. Furthermore, the arrangement of the parts should be sufficiently flexible to permit a thermostatic switch or other control to be located at any desired point on the range, either adjacent or remote from the surface heater.

An object of the invention is to accurately control the temperature of utensils used upon the surface heaters of cooking ranges and the like.

Another object of the invention is to utilize a heat sensitive element which will be highly responsive to temperature changes but durable in construction.

Another object of the invention is to permit installation of the device in confined spaces without affecting its ability to operate satisfactorily.

Another object of the invention is to insure response of the device to the temperature condition of the cooking vessel.

Another object of the invention is to permit location of the control for the heat sensitive device at a point remote from the heating unit.

Another object of the invention is to enable a variety of different switches or oven controls to be utilized in connection with the surface heater while retaining the advantages of the control.

Another object of the invention is to render the device applicable to existing ranges without material changes in the standard designs.

Other objects and advantages will become apparent from the following description taken in connection with the accompanying drawings wherein:

Fig. 1 is a somewhat schematic view showing in elevation the control panel and parts of an electric range, and in section the surface heater to which one embodiment of the invention is applied.

Fig. 2 is a plan view of the arrangement shown in Fig. 1 but on a reduced scale.

Figs. 3 to 5 are sectional views of modifications.

Fig. 6 is a plan view of the under side of the embodiments shown in Figs. 3 to 5, and Figs. 7 and 8 are sectional views of further modifications.

While the invention is shown and described in connection with the top unit or surface heater construction of an electric range, it should be understood that it is equally applicable for controlling similar heating devices on gas ranges. Moreover, the invention is not limited to such heating devices for appliances of the kind chosen for descriptive purposes herein but may find a wide field of usefulness wherever the control of temperatures is desired.

Referring more particularly to the drawings, there is shown in Figs. 1 and 2, the top plate 10 of an electric range having an aperture 12 therein for the reception of the annular heating elements 14 and 16 of the surface heater. The heating elements 14 and 16 are nested one within the other and supported on arms 18 of a base member within the opening 12 so that their exposed surfaces 20 and 22 respectively lie substantially flush with the surface 23 of the top plate 10. The heating elements 14 and 16 are connected by wires 24 and 26 to the terminals 28 and 30 respectively of a thermostatically operated electric switch 32 which receives current from a source of supply by way of wires 34 connected to the terminals 36 (only one such wire and terminal being shown). The thermostatic switch 32 is connected by a bracket 38 to the inner face of the front panel 40 of the range and is provided with an operating shaft 42 projecting through said panel and carrying an operating member or dial 44 on the exterior thereof. As the thermostatically operated electric switch and its associated mechanism forms no part of the present invention, further description is deemed unnecessary.

This invention is more particularly directed to the provision of means for controlling the temperature of the heating units 14 and 16. To this end, the capillary tube 46 which extends from the switch 32 is provided at its opposite end with a hollow member 48 positioned within the inner heating element 16 but spaced from the wall thereof. The hollow member 48 is in the form of a disk having walls of sufficient thickness to lend rigidity to the member but permitting good conduction of heat therethrough. The hollow member 48 contains an expansible fluid 50 which may be inserted into the hollow member by way of the filling tube 52. As is usual in thermostatic controls of the liquid type, the fluid 50 completely fills the hollow member and the capillary tube 46 as well as the diaphragm or other expansible member, not shown, embodied within the switch housing 32.

The hollow member 48 in this embodiment is adapted to be both supported in position and shielded from the heat of the heating elements by the provision of an inverted cup-shaped housing 54 which encloses the hollow member but has an aperture 56 in its bottom face through which the hollow member 48 may project to expose a relatively large surface area for its volumetric capacity beyond the housing. The hollow member 48 is provided with a circumferential shoulder 58 surrounding the exposed area and adapted to engage the bottom face of the housing 54 around the aperture 56 therein and be maintained in close relationship therewith by means of one or more lugs 60 secured by the screws 62 to the inside of the housing in engagement with the opposite surface of the hollow member 48. The housing 54 is further provided at the end opposite the opening 56 with a flange 64 engaging the arms 18 of the base member and adapted to receive screws 66 or other suitable means for securing it in position. Support for the capillary tube 46 is provided by a strap member 68 extending across the tube 46 and secured, as by the screws 70, to the flange 64 of the housing. Circulation of air through the housing is provided for by the holes 67 formed in the side walls thereof.

In Figs. 3 to 7 various modifications incorporating a switch to be operated by the cooking vessel are shown. As various parts correspond to parts described and shown in connection with Figs. 1 and 2, similar reference numerals have been used where applicable. Parts not appearing on the sectional views, Figs. 3 to 5, may be found on the plan view Fig. 6. In Fig. 3 the hollow member comprises a plate 72 having a relatively large surface area exposed beyond the housing 74 and being provided with a stepped recess 76 to receive a closure plate 78 which may be welded or otherwise secured thereto. The space 79 between the plates 72 and 78 may contain the expansible fluid which also fills the capillary tube 80 connected thereto as in the previous embodiment. The two plates 72 and 78 forming the hollow fluid containing member in this embodiment are retained in position in the housing 74 by screws 82 projecting laterally into the housing and engaging with the bottom edge of the plate 72.

In this embodiment, however, the flanged end 83 of the housing 74, which was left open in the previous embodiment, is closed by means of the plate 84 secured to the flange 83 by screws 85. As previously described, the housing 74 and in this instance the plate 84 may be secured to the arms 18 of the base member. A projection 86 extends from the central portion of the plate 84 into the housing 74 and is perforated for the reception of a plunger 88 extending therethrough. The plate 72 is provided with a central bearing in the form of an apertured boss 90 which extends across the fluid containing space 79 and through an aperture in the plate 78 where it is secured in sealing engagement therewith. At one end the plunger 88 extends slidably through the boss 90 and projects beyond the exposed surface of the plate 72. At the opposite end, the plunger 88 projects through the projection 86 on the plate 84 and is secured to the median portion of a flexible switch arm 92 which it is adapted to operate. Suitable securing means may comprise a washer 93 engaging the underside of switch arm 92 and retained in position by the pin 95 extending through the plunger 88.

One end of the flexible switch arm 92 is pivotally supported in a bracket 94 depending from the plate 84 and the free end of said arm carries a contact bridge 96 separated from the arm by an insulating strip 97. A coil spring 98 surrounds that portion of the plunger extending between the boss 90 and the projection 86. The spring 98 engages at one end with a washer 100 embedded in the plunger 88 adjacent the boss 90 and its other end rests upon the projection 86. A second coil spring 102 surrounds that portion of the plunger 88 between the switch arm 92 and the projection 86 and engages at one end with a washer 104 embedded in the plunger adjacent the projection 86.

A cover 106 is secured to the plate 84 by screws 107 projecting through lugs 109 on the cover and serves to house the flexible switch arm 92 and its bracket 94. The cover is open at the end adjacent the contact bridge 96 for the reception of an insulating block 112 secured by screws 113 to the plate 84. The block 112 carries a pair of fixed switch arms 108 having contacts 110 supported thereby in operative relation with the contact bridge 96. The switch arms 108 may be secured, as shown, to the insulating block 112 by means of the screws 114 and project from the cover 106 in the form of terminals 116. Suitable connections (not shown) may be provided for electrically connecting the terminals 116 in series with the heating units 14 and 16.

In Fig. 4 the plate 118 corresponding to the plate 72 in the previously described embodiment is adapted to project beyond the plane 22 of the surface heater 16 in the absence of a cooking vessel. However, when the cooking vessel is supported on the surface heater, the plate 118 is adapted to be depressed thereby and thus maintain contact with the underside of such vessel. The structure for accomplishing this function comprises the inverted cup-shaped housing 120 interposed between the plate 118 and the wall of the heating element 16 and having an opening in its bottom face through which the plate 118 projects. A circumferential shoulder 124 formed on the plate 118 engages with the bottom face of the housing 120 as in previous embodiments. A closure plate 126 is welded or otherwise sealed in the recess of the plate 118, and the space therebetween is filled with an expansible fluid. The hollow fluid containing member thus formed by the plates 118 and 126 is resiliently supported in the housing 120 by means of a coil spring 128 extending between the plate 126 and a thimble member 130 supported upon the projection 86 of the plate 84. The plate 84 may carry the cover 106 containing switch mechanism similar to that of the previously described embodiment.

The plunger 132 in this instance extends from the switch arm 92 through the projection 86 and terminates in a blind-ended opening formed in a boss 134 on the plate 118. A coil spring 102 and washer 104 similar to those previously described may be associated with the plunger and switch arm in this instance also. In order to avoid undue strain on the capillary tubing 80 when the hollow member moves longitudinally in the housing, the tubing in this instance may be helically coiled as at 136 in the housing 120 to provide the required flexibility.

In Fig. 5 the cup-shaped housing of the former embodiments is used in part as the hollow fluid containing member, thus reducing the number of parts required. As shown, the structure comprises an inverted cup-shaped housing member 138 having an axially disposed depression 140 in its bottom face. The depression 140 is perforated for the reception of a sleeve member 142 secured thereto by welding or other suitable sealing means, the depression providing for such connection while maintaining the sleeve below or flush with the bottom surface of the housing. A plate 144 extends across the inside of the housing 138 engaging the underside of the depression therein and being sealed by welding or other means to the housing. The space remaining between the plate and housing around the depression is adapted to be filled with an expensive fluid.

The sleeve 142 projects through an opening in the plate 144 and is sealed thereto. The plunger 88 in this instance is similar to that in Fig. 3 and projects through the sleeve 142 beyond the plane of the heating elements 14 and 16. As the remaining parts may be similar in all respects to those described in connection with previous embodiments, further detailed explanation is unnecessary.

In Fig. 7 the housing for the hollow fluid containing member is dispensed with entirely. The recessed plate 146 in this instance has an axial boss 148 depending therefrom and an annular closure plate 150 sealed at its inner and outer walls to the boss and the wall of the recess respectively. As in previous cases the space 152 between the plates is filled with an expansive fluid. The cover 106 containing the switch mechanism is similar to that described and shown in connection with Fig. 4 as is the helical arrangement of the capillary tubing 80 surmounting the plate 84. The arms 18 of the base member for the heating elements may be utilized as a means of support for the plate 84, screws or other devices (not shown) being provided for the attachment.

Fig. 8 shows a form not including the switch of the previous instances. However, this embodiment distinguishes from that shown in Figs. 1 and 2, and is similar to Fig. 4, by having the plate 118 of the hollow member arranged to move bodily into and out of the housing 120 in the presence and absence respectively of a cooking vessel on the heating elements. The plunger 154 in this embodiment terminates adjacent the underside of the plate 84 but is otherwise identical with the plunger 132 of Fig. 4. Other parts shown are also similar to equivalent parts of Fig. 4 and are identified by similar reference numerals. Detailed description of the parts will, therefore, not be repeated in connection with this embodiment.

In the operation of the structure shown in Figs. 1 and 2 the dial 44 is first operated to the "on" position when current will flow from the power line 34 through the switch 32 to energize the heating elements 14 and 16 by way of the wires 24 and 26. The cooking vessel which is supported on the surfaces 20 and 22 of the heating units receives heat therefrom in the usual manner. The surface of the hollow member 48 which is exposed substantially in the plane of the supporting surfaces 20 and 22 receives heat from the cooking vessel which is conducted to the expansible and contractible fluid 50 within the hollow member 48. The expansion and contraction of the fluid is transmitted by way of the capillary tube 46 to operate the thermostatic switch 32 in a well-known manner and thus control the temperature at which the food in the vessel will be cooked.

The hollow member 48 is in juxtaposed relationship with the inner heating element 16 but is shielded from the heat thereof by the housing 54. Thus the thermal element is responsive primarily to the temperature of the cooking vessel and is only slightly affected by the temperature of the heating element. The large area of surface of the thermal element exposed to the temperature of the vessel as compared with its volumetric capacity provides quick response to the temperature of the cooking vessel, both in becoming quickly heated and quickly cooled.

In the embodiments of Fig. 3 the cooking vessel depresses the plunger 88 and causes engagement of the contacts 96 and 110. Due to the series connection of this switch in the circuit of the heating elements no current can flow to these elements until such contact is made. Thus removal of the cooking vessel causes instant deenergization of the heating units without operation of the main switch 32. The latter switch is, however, under control of the thermal element during the cooking operation as will be apparent.

The operation of the device as embodied in Fig. 4 is similar to the foregoing embodiment Fig. 3. The cooking vessel in this case, however, depresses the thermal hollow member against the pressure of the coil spring 128. The surface of the hollow member, in this instance the plate 118, is moved to a position substantially flush with the flange 122 and the surface of the heating elements. The contacts are closed by this movement and energization of the heating elements takes place.

As the remaining embodiments are merely variations of the three previously described, their mode of operation would involve mere repetition in description over what has been described before. The principle of the invention is clearly pointed out herein and specific forms described and shown, but it will be understood that all other modifications falling within the scope of the appended claims are to be considered as included as part of the invention.

We claim:

1. In a heating appliance, an annular electric surface heater for supporting a vessel to be heated, thermostatic means for regulating the temperature of said vessel comprising a flat, hollow member containing an expansive fluid in juxtaposed relation to the said surface, a shield interposed between said member and surface, a flange on said shield engaging an outer portion of said member leaving a relatively large surface area thereof for its volumetric capacity projecting beyond the plane of said supporting surface to engage the vessel supported thereon, a base member carrying said shield, a spring operable between said base and hollow members to permit movement of said hollow member toward the plane of said supporting surface when the vessel is placed thereon, a plunger carried by said hollow member and projecting through said base member, a movable switch arm engaging said plunger and pivoted on said base member, a fixed switch arm secured to said base member, and contact elements carried by said fixed and movable switch arms to be opened and closed by movement of the hollow member by said vessel to control the flow of current to said surface heater under temperature regulation of said thermostatic means.

2. In a heating appliance, an annular electric surface heater for supporting a vessel to be heated, thermostat means for regulating the temperature of said vessel comprising a hollow member supportable within the annular surface and containing an expansible fluid, said member having a substantially flat surface adapted for exposure substantially in the plane of said annular surface in proximate relation to the vessel supported thereon, a capillary tube extending from an unexposed surface of said member, a shield interposed between said member and said annular surface and providing support for said capillary tube, and a projection extending from said shield into engagement with said unexposed surface of said member for supporting said member in position within the annular surface.

VICTOR WEBER.
SAMUEL G. ESKIN.